(12) United States Patent
Baruzzi et al.

(10) Patent No.: US 10,658,856 B1
(45) Date of Patent: May 19, 2020

(54) BATTERY PACK AND DISCHARGE METHOD FOR LIMITING AN EXCESSIVE DISCHARGE CURRENT

(71) Applicant: Monolithic Power Systems, Inc., San Jose, CA (US)

(72) Inventors: Paolo Baruzzi, Fremont, CA (US); Kai Chen, Chengdu (CN)

(73) Assignee: Monolithic Power Systems, Inc., San Jose, CA (US)

( * ) Notice: Subject to any disclaimer, the term of this patent is extended or adjusted under 35 U.S.C. 154(b) by 13 days.

(21) Appl. No.: 16/179,782

(22) Filed: Nov. 2, 2018

(51) Int. Cl.
*H02J 7/00* (2006.01)

(52) U.S. Cl.
CPC .......... *H02J 7/0063* (2013.01); *H02J 7/0078* (2013.01); *H02J 2007/0067* (2013.01); *H02J 2007/0095* (2013.01)

(58) Field of Classification Search
CPC .............. H02J 7/0063; H02J 7/0078; H02J 2007/0095; H02J 2007/0067
USPC ..................................... 320/129, 135, 162
See application file for complete search history.

(56) References Cited

U.S. PATENT DOCUMENTS

| 6,593,725 | B1 * | 7/2003 | Gallagher | ............. | H02M 3/156 323/275 |
| 7,236,041 | B2 | 6/2007 | Kim et al. | | |
| 9,608,516 | B2 * | 3/2017 | Xu | .......................... | H02M 3/04 |

* cited by examiner

*Primary Examiner* — Nghia M Doan
(74) *Attorney, Agent, or Firm* — Perkins Coie LLP

(57) ABSTRACT

A battery management system (BMS) used in a battery pack, the battery pack has a discharging switch coupled between a battery and a load, and the load has a capacitor charged by the battery pack. The BMS has a driver circuit having a power supply terminal to receive a drive voltage, a ground reference terminal coupled to receive the battery pack voltage and an output terminal coupled to a control terminal of the discharging switch. The BMS generates a normal drive voltage and a ramp drive voltage, and the normal drive voltage is selected as the drive voltage when the voltage difference between the battery voltage and the battery pack voltage is less than a threshold voltage, and the ramp drive voltage is selected as the drive voltage when the voltage difference between the battery voltage and the battery pack voltage is higher than the threshold voltage.

20 Claims, 7 Drawing Sheets

BATTERY PACK AND DISCHARGE METHOD FOR LIMITING AN EXCESSIVE DISCHARGE CURRENT

TECHNICAL FIELD

The present invention generally relates to electrical circuit, and more specifically relates to battery packs and battery pack discharge methods for limiting an excessive discharge current.

BACKGROUND

Secondary batteries (e.g., rechargeable batteries) are actively researched due to development of portable electronic devices such as, for example, E-bikes, E-scooters, and power and gardening tools. FIG. 1 schematically shows a traditional battery pack 100. As shown in FIG. 1, the battery pack 100 comprises a battery 10, a charge and discharge circuit 20, a battery management system (BMS) 30, an external pre-bias circuit 40 and pack terminals 50.

The battery 10 may include one or more battery cells 11, which may be a rechargeable secondary battery. The charge and discharge circuit 20 including a charging switch 101 and a discharging switch 102 is arranged between the battery 10 and the pack terminals 50. The BMS 30 is coupled to the battery 10 and is configured to generate a charging control signal CHG and a discharging control signal DSG to control the charging switch 101 and the discharging switch 102, respectively. The battery pack 100 may be coupled with a load or an external power source via the pack terminals 50. When the external power source is connected to the battery pack 100 via the pack terminals 50, the battery 10 is charged through the charging switch 101 and the charging switch 102 or its parasitic diode D2. When the load is connected to the battery pack 100 via the pack terminals 50, the discharge to the load is performed through the charging switch 101 or its parasitic diode D1 and the discharging switch 102. The load may be a motor driven device such as an E-bike including a capacitor 60 charged by the battery pack 100 and a motor driven by the electrical charge stored in the capacitor 60. As shown in FIG. 1, the capacitor 60 is connected between a positive pack terminal P+ and a negative pack terminal P− in parallel to the battery pack 100.

When the motor driven device, such as an E-bike, is turned OFF for quite some time, the capacitor 60 is fully discharged and there is no electrical charge in the capacitor 60, as a result, the voltage across the capacitor 60 is 0V. Then when the discharging switch 102 is turned ON by the BMS 30, typically after turning ON of the charging switch 101, the capacitor 60 coupled between the pack terminals 50 tends to receive an excessive current that can cause damage or trip over current protection. To mitigate these issues, the external pre-bias circuit 40 is typically present so that the excessive current flowing into the capacitor 60 is prevented when the capacitor 60 is fully discharged, that is when there is no accumulated electrical charge in the capacitor 60. As shown in FIG. 1, the external pre-bias circuit 40 typically includes a current limiting switch 103 and a current limiting resistor 104 to avoid the excessive current flowing into the capacitor 60. The external pre-bias circuit 40 is typically located on the printed circuit board of the BMS 30 and then is combined with the battery pack 100.

However, there are undesired drawbacks such as two additional off-chip components resulting in additional cost and PCB area, and longer than the desired battery pack turn-on time, since the battery pack turn-ON time is limited by an RC profile dictated by the capacitor 60 and the current limiting resistor 104.

SUMMARY

Embodiments of the present invention are directed to a battery management system (BMS) used in a battery pack, wherein the battery pack has a discharging switch coupled between a battery and a load, and wherein the load has a capacitor charged by the battery pack, the BMS is configured to generate a normal drive voltage and a ramp drive voltage, and the BMS comprises a driver circuit having a power supply terminal, a ground reference terminal and an output terminal, wherein the power supply terminal is coupled to receive a drive voltage, the ground reference terminal is coupled to receive the battery pack voltage, and the output terminal is coupled to a control terminal of the discharging switch, wherein the normal drive voltage is selected as the drive voltage of the driver circuit when the voltage difference between the battery voltage and the battery pack voltage is less than a threshold voltage, and the ramp drive voltage is selected as the drive voltage of the driver circuit when the voltage difference between the battery voltage and the battery pack voltage is higher than the threshold voltage, and wherein the driver circuit is configured to generate a discharging control signal to control the discharging switch.

BRIEF DESCRIPTION OF THE DRAWING

The present invention can be further understood with reference to the following detailed description and the appended drawings.

The use of the same reference label in different drawings indicates the same or like components.

DETAILED DESCRIPTION

Various embodiments of the technology will now be described. In the following description, some specific details, such as example circuits and example values for these circuit components, devices or process, are included to provide a thorough understanding of embodiments. One skilled in the relevant art will recognize, however, that the technology can be practiced without one or more specific details, or with other methods components, materials, etc.

Throughout the specification, the terms "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. Moreover, the drawings are only for illustration purpose. Usually, these drawings are not necessarily drawn to scale. Persons of ordinary skill in the art will appreciate that the terms "coupled" or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Figure 1:
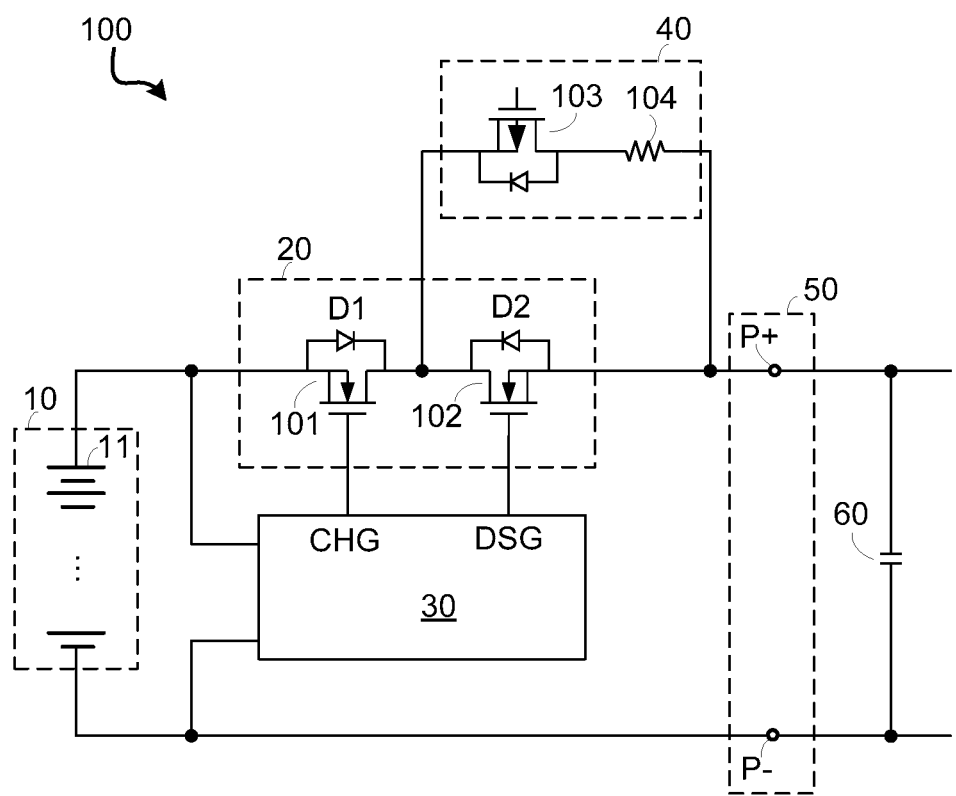
FIG. 1 schematically shows a traditional battery pack 100.
Figure 2:
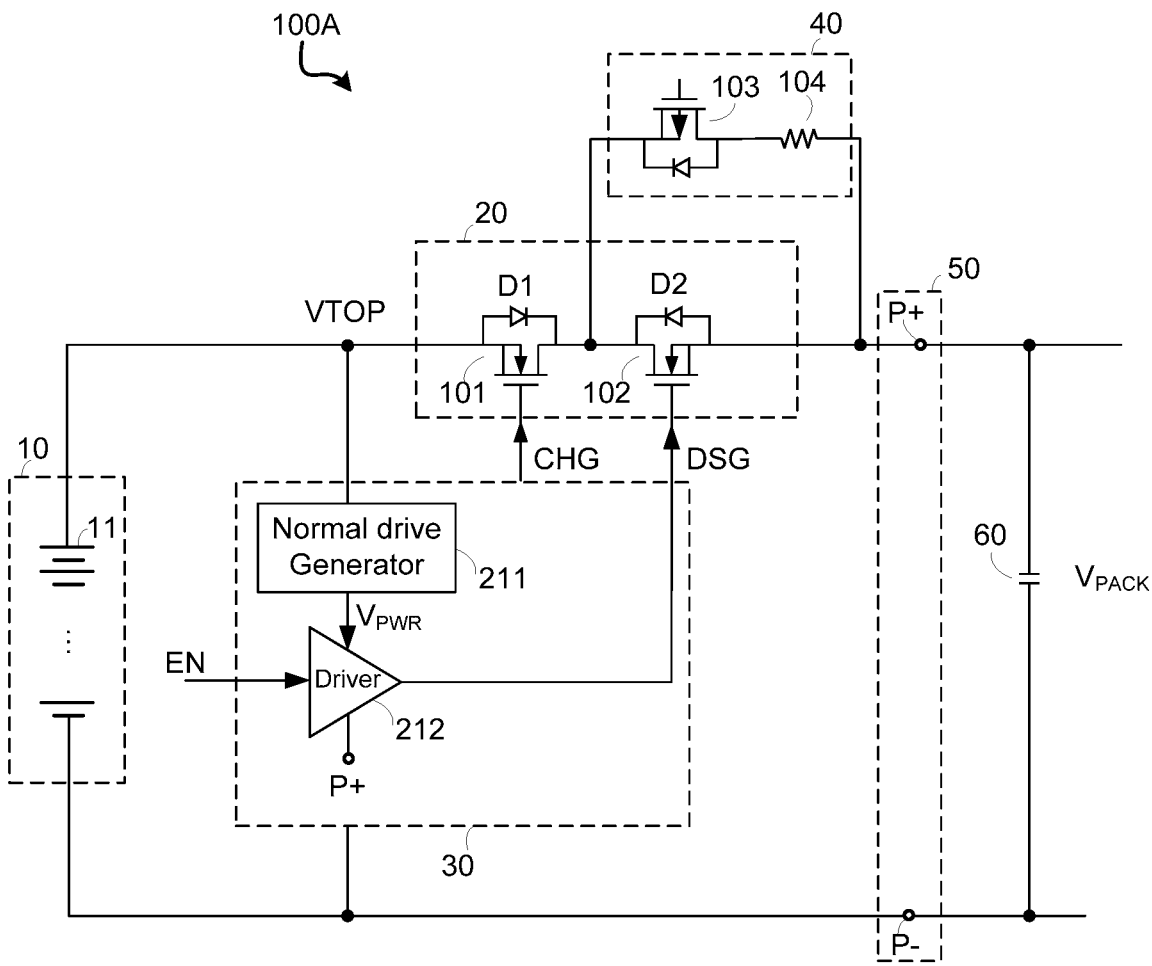
FIG. 2 shows a traditional battery pack 100A.

FIG. 2 shows a traditional battery pack 100A. The battery pack 100A of FIG. 2 are different from the battery pack 100 of FIG. 1 in that a normal drive generator 211 and a driver circuit 212 are further shown in the BMS 30. The normal drive generator 211 is configured to provide a proper drive voltage $V_{PWR}$ to the driver circuit 212. The driver circuit 212 comprises a pull-up-pull-down circuit and is configured to charge and discharge a control terminal of the discharging switch 102, thereby controlling the discharging switch 102. The driver circuit 212 has a power supply terminal, a ground reference terminal, an enable terminal and an output terminal, wherein the enable terminal is coupled to receive an enable signal EN that determines to turn ON/OFF the discharging switch 102, the output terminal is configured to provide the discharging control signal DSG to the control terminal of the discharging switch 102.

As shown in FIG. 2, the discharging switch 102 comprises an NMOS device having a gate terminal, a source terminal and a drain terminal. The normal drive generator 211 including a charger pump circuit is used to generate the drive voltage $V_{PWR}$ which is typically higher than the battery voltage $V_{TOP}$, since a positive voltage difference between the gate terminal and the source terminal is required in order to turn ON the NMOS device. In addition, the power supply terminal of the driver 212 is coupled to receive the drive voltage $V_{PWR}$, and the ground reference terminal of the driver circuit 212 is coupled to the positive pack terminal p+ to receive the battery pack voltage $V_{PACK}$.

In the example of FIG. 2, the discharging switch 102 is controlled by the drive voltage $V_{PWR}$ to operate exclusively in linear mode and is fully turned ON. When the capacitor 60 is fully discharged and the discharging switch 102 is turned ON by the BMS 30, the capacitor 60 tends to receive an excessive current that can cause damage.

Moreover, if a slower turn-ON time of the discharging switch 102 is needed, the switching speed of the discharging switch 102 is slowed down by adding an external gate resistor with high resistance, and then the discharging switch 102 will operate in linear mode for a longer time and could violate by SOA limitations.

According to embodiments of the present invention, a battery pack has a discharging switch coupled between a battery and a load, wherein the load has a capacitor charged by the battery pack, a BMS is configured to generate a normal drive voltage and a ramp drive voltage, and the BMS comprise a driver circuit having a power supply terminal coupled to receive a drive voltage, a ground reference terminal coupled to receive the battery pack voltage, and an output terminal coupled to a control terminal of the discharging switch, wherein when the voltage difference between the battery voltage and the battery pack voltage is less than a threshold voltage, the normal drive voltage is selected as the drive voltage of the driver circuit, and when the voltage difference between the battery voltage and the battery pack voltage is higher than the threshold voltage the ramp drive voltage is selected as the drive voltage of the driver circuit, and wherein the driver circuit is configured to generate a discharging control signal to control the discharging switch.

Figure 3:
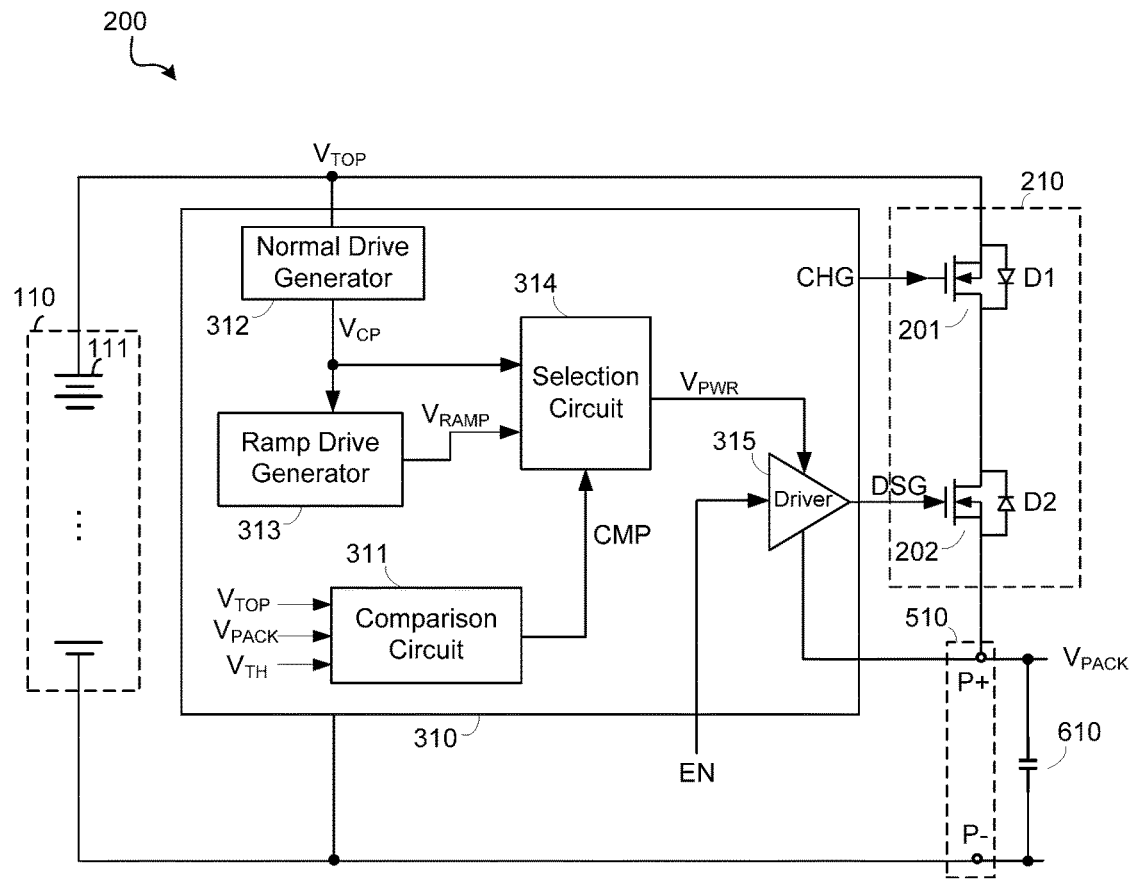
FIG. 3 shows a battery pack 200 in accordance with one embodiment of the present invention.

FIG. 3 shows a battery pack 200 in accordance with one embodiment of the present invention. In the embodiment of FIG. 3, the battery pack 200 comprises a battery 110, a charge and discharge circuit 210, a BMS 310 and pack terminals 510.

The battery 110 may include one or more battery cells 111, which may be a rechargeable secondary battery such as, for example, a nickel-cadmium battery, a lead battery, a nick metal hydride battery (NiMH), a lithium ion battery, and a lithium polymer battery.

The charge and discharge circuit 210 including a charging switch 201 and a discharging switch 202 is arranged between the battery 110 and the pack terminals 510. The charging switch 201 and discharging switch 202 may be any controllable semiconductor devices, such as MOSFET (metal oxide semiconductor field effect transistor), IGBT (isolated gate bipolar transistor) and so on. In the embodiment of FIG. 3, the charging switch 201 and discharging switch 202 are NMOS devices. In another embodiment, the charging switch 201 and discharging switch 202 could be PMOS devices.

In the embodiment of FIG. 3, the charge and discharge circuit 210 is coupled between a positive terminal of the battery 110 and a positive pack terminal P+. In the other embodiment, the charge and discharge circuit 210 is coupled between a negative terminal of the battery 110 and a negative pack terminal P−.

Usually, the BMS 310 is coupled to the battery 110 and is configured to generate a charging control signal CHG and a discharging control signal DSG to control the charging switch 201 and the discharging switch 202, respectively. In detail, when an external power source is connected to the battery pack 200 via the pack terminals 510, the battery 110 is charged through a discharging switch 202 or its parasitic diode D2 and the charging switch 201.

A load may be a motor driven device including a capacitor 610 charged by the battery pack 200 and a motor driven by the electrical charge stored in the capacitor 610. When the load is connected to the battery pack 200 via the pack terminals 510, an enable signal EN to turn ON the discharging switch 202 will be received, and then the discharge to the load is performed through the charging switch 201 or its parasitic diode D1 and the discharging switch 202.

In the embodiment of FIG. 3, the BMS 310 is configured to sense the battery voltage $V_{TOP}$ and the battery pack voltage $V_{PACK}$ and is configured to generate a normal drive voltage $V_{CP}$ and a ramp drive voltage $V_{RAMP}$, and the BMS 310 comprises a driver circuit 315 having a power supply terminal, a ground reference terminal and an output terminal, wherein the power supply terminal is coupled to receive a drive voltage $V_{PWR}$, the ground reference terminal is coupled to receive the battery pack voltage $V_{PACK}$, and the output terminal is coupled to a control terminal of the discharging switch 202. The driver circuit 315 comprises a pull-up-pull-down circuit and is configured to charge and discharge the control terminal of the discharging switch 102. In one embodiment, the pull-up-pull-down circuit comprises a complementary metal oxide semiconductor (CMOS) inverter including a PMOS transistor and a NMOS transistor. In other embodiments, the pull-up-pull-down circuit may have different circuit configurations while having the same or similar function.

When the voltage difference between the battery voltage $V_{TOP}$ and the battery pack voltage $V_{PACK}$ is less than a threshold voltage $V_{TH}$, i.e., when $V_{TOP}-V_{PACK}<V_{TH}$, the normal drive voltage $V_{CP}$ is selected as the drive voltage $V_{PWR}$ of the driver circuit 315, and when $V_{TOP}-V_{PACK}>V_{TH}$, the ramp drive voltage $V_{RAMP}$ is selected as the drive voltage $V_{PWR}$ of the driver circuit 315. The driver circuit 315 is configured to generate a discharging control signal DSG to control the discharging switch 202. In one embodiment, the normal drive voltage $V_{CP}$ is configured to make the discharging switch 202 be fully turned ON, and the ramp drive voltage $V_{RAMP}$ is configured to make the discharging switch 202 operate in three operational states. Details of the three operational states will be described later with reference to FIG. 4.

The BMS 310 further comprises a comparison circuit 311, a normal drive voltage generator 312, a ramp driver target generator 313 and a selection circuit 314, except the driver circuit 315. The comparison circuit 311 is configured to receive the battery voltage $V_{TOP}$, the battery pack voltage $V_{PACK}$ and the threshold voltage $V_{TH}$, wherein the comparison circuit 311 is configured to provide a comparison signal CMP based on a comparison of the voltage difference $V_{TOP}-V_{PACK}$ and the threshold voltage $V_{TH}$.

The normal drive generator 312 is configured to generate the normal drive voltage $V_{CP}$ at the output terminal and has a general structure as the normal drive generator 211 shown in the FIG. 2. In one embodiment, the normal drive generator 312 comprises a charger pump circuit configured to provide the normal drive voltage $V_{CP}$ higher than the battery voltage $V_{TOP}$. In another embodiment, the normal drive generator 312 comprises a charger pump circuit and a low dropout regulator (LDO).

The ramp drive generator 313 is configured to receive the normal drive voltage $V_{CP}$ and to generate the ramp drive voltage $V_{RAMP}$ at the output terminal. The ramp drive voltage $V_{RAMP}$ is gradually increased to reach the normal drive voltage $V_{CP}$ for limiting an excessive current flowing into the capacitor 610. The selection circuit 314 has a first input terminal, a second input terminal, a control terminal and an output terminal, wherein the first input terminal is coupled to the output terminal of the normal drive generator 312 to receive the normal drive voltage $V_{CP}$, the second input terminal is coupled to the output terminal of the ramp drive generator 313 to receive the ramp drive voltage $V_{RAMP}$, the control terminal is coupled to the output terminal of the comparison circuit 310 to receive the comparison signal CMP. The selection circuit 314 is configured to select the ramp drive voltage $V_{RAMP}$ or the normal drive voltage $V_{CP}$ as a drive voltage $V_{PWR}$ based on the comparison signal CMP, and is configured to provide the drive voltage $V_{PWR}$ at the output terminal. In one embodiment, when $V_{TOP}-V_{PACK}<V_{TH}$, the comparison signal CMP is at a low level, the normal drive voltage $V_{CP}$ is selected as the drive voltage $V_{PWR}$ and is provided to the driver circuit 315, and when $V_{TOP}-V_{PACK}>V_{TH}$, the comparison signal CMP is at a high level, the ramp drive voltage $V_{RAMP}$ is selected as the drive voltage $V_{PWR}$ and is provided to the driver circuit 315. That means the drive voltage $V_{PWR}$ provided to the driver circuit 315 is switchable between the normal drive voltage $V_{CP}$ and the ramp drive voltage $V_{RAMP}$ based on the output of the comparison circuit 311.

The driver circuit 315 further has an enable terminal, wherein the enable terminal is configured to receive the enable signal EN that determines to turn ON/OFF the discharging switch 202. In one embodiment, when the enable signal EN is at high level, the driver circuit 315 is enable and is configured to turn ON the discharging switch 202, when the enable signal EN is at low level, the driver circuit 315 is disable and is configured to turn OFF the discharging switch 202.

In one embodiment, during operation of the battery pack 200, once the enable signal EN to turn ON the discharging switch 202 is received, the comparison circuit 312 is configured to determine if there is some electrical charge in the capacitor 610 by comparing the voltage difference $V_{TOP}-V_{PACK}$ with the threshold voltage $V_{TH}$, then the drive voltage $V_{PWR}$ provided to the driver circuit 315 is selected from the normal drive voltage $V_{CP}$ or the ramp drive voltage $V_{RAMP}$ based on the output of the comparison circuit 311.

If there is still some electrical charge in the capacitor 610 and $V_{TOP}-V_{PACK}<V_{TH}$, the comparison signal CMP is at the low level, and then the normal drive voltage $V_{CP}$ is selected as the driver voltage $V_{PWR}$ of the driver circuit 315 to turn ON the discharging switch 202 and the discharging switch 202 is exclusively and fully turned ON. If $V_{TOP}-V_{PACK}>V_{TH}$, for example, the capacitor 610 is fully discharged, the comparison signal CMP is at the high level, and then the ramp drive voltage $V_{RAMP}$ is selected as the driver voltage $V_{PWR}$ of the driver circuit 315 to turn ON the discharging switch 202 and make the discharging switch 202 operate in three operational states. Wherein the ramp drive voltage $V_{RAMP}$ is gradually increased to reach the normal drive voltage $V_{CP}$ to limit the excessive current flowing into the capacitor 610.

Figure 4:
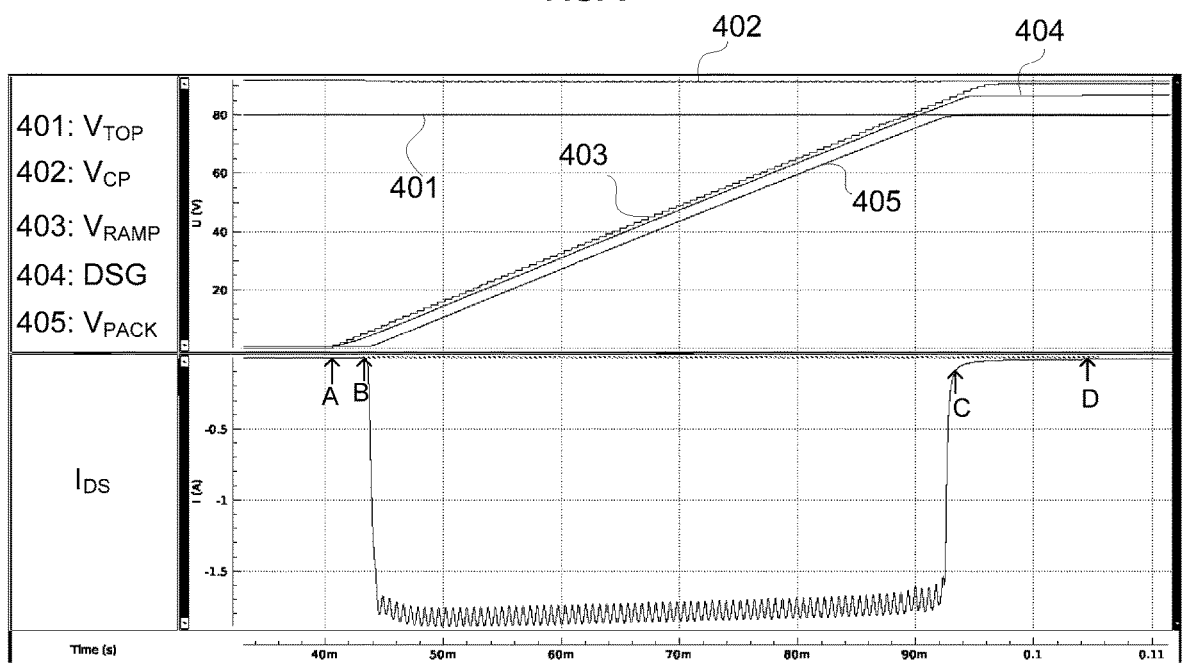
FIG. 4 shows a waveform diagram of the battery pack 200 shown in FIG. 3 in accordance with an embodiment of the present invention.

FIG. 4 shows a waveform diagram of the battery pack 200 shown in FIG. 3 in accordance with an embodiment of the present invention. In detail, FIG. 4 shows in turn the waveform of the battery voltage $V_{TOP}$ (401), the normal drive voltage $V_{CP}$ (402), the ramp drive voltage $V_{RAMP}$ (403), the discharging control signal DSG (404), the battery pack voltage $V_{PACK}$ (405) and the current $I_{DS}$ flowing through the discharging switch 202.

In the embodiment of FIG. 4, the battery voltage $V_{TOP}$ is fixed, and the normal drive voltage $V_{CP}$ is substantially equal to the sum of the battery voltage $V_{TOP}$ and a bias voltage. This means the normal drive voltage $V_{CP}$ is always higher than the battery voltage $V_{TOP}$ and the voltage difference between the normal drive voltage $V_{CP}$ and the battery voltage $V_{TOP}$ is substantially constant.

FIG. 4 also shows the three operational states of the discharging switch 202. Before point A, the capacitor 610 is fully discharged and there is no electrical charge in the capacitor 610, the battery pack voltage $V_{PACK}$ is, such as 0V. The discharging switch 202 is off and the entire voltage difference $V_{TOP}-V_{PACK}$ drops across the discharging switch 202. When the enable signal EN to turn ON the discharging switch 202 is received and the condition $V_{TOP}-V_{PACK}>V_{TH}$ is determined, the ramp voltage $V_{RAMP}$ is being increased continuously from point A, and then the discharging control signal DSG starts to increase. In the embodiment of FIG. 4, the discharging control signal DSG tends to follow the ramp drive voltage $V_{RAMP}$. From point A and point B, the discharging switch 202 operates in a first operational state and operates in cut-off region, and thus the battery pack voltage $V_{PACK}$ is unchanged. From point B to point C, with gradually increasing of the ramp drive voltage $V_{RAMP}$, the current $I_{DS}$ starts to flow, and thus the battery pack voltage $V_{PACK}$ also starts to increase with a slope. Actually, the battery pack voltage $V_{PACK}$ tends to follow the discharging control signal DSG, the current $I_{DS}$ is kept to be C1*(dv/dt), where C1 is representative of the value of the capacitor 610, dv/dt is representative of the slope of the battery pack voltage $V_{PACK}$. During the period between point B and point C, the discharging switch 202 operates in the saturation region, as a second operational state. As a result, the current $I_{DS}$ flowing into the capacitor 610 is limited when the discharging switch 202 operates in the cut-off region and the saturation region, no excessive current occurs. Finally, from point C, the discharging switch 202 starts to be fully turned ON, and is being operated in the linear region until point D, and the ramp drive voltage $V_{RAMP}$ is increased to reach the normal drive voltage $V_{CP}$. The operation of the discharging switch 202 between the period between point C and D is called as a third operational state.

As shown in FIG. 4, the discharging switch 202 shifts from operating in cut-off state to operating in saturation mode, and finally, to operating in linear mode and being fully turning ON. However, in the prior art, the discharging switch 102 shown in FIG. 1 or 2 is designed to always be fully turned ON.

In addition, in the embodiment of FIG. 4, the slope of the ramp drive voltage $V_{RAMP}$ is fixed for convenience, and thus the slope of the discharging control signal DSG and the slope of the battery pack voltage $V_{PACK}$ are fixed. In another embodiment, the switching speed of the discharging switch 202 can be adjusted by changing the slope of the ramp drive voltage $V_{RAMP}$. For example, the turn-ON time of the discharging switch 202 could be shorter with a first slope of the ramp drive voltage $V_{RAMP}$, or could be longer with a second slope of the ramp drive voltage $V_{RAMP}$, wherein the first slope is higher than the second slope. In other words, the ramp drive voltage $V_{RAMP}$ could be generated to have variable and controllable slope, in order to achieve a desired turn-ON time of the discharging switch 202.

In view of the foregoing, the present invention can overcome the limitations of the prior art described above by further introducing the ramp drive voltage $V_{RAMP}$. The present invention can eliminate the need for the two additional off-chip components including a current limiting switch and a current limiting resistor. Moreover, the present invention facilitates the adjustment of the turn-ON time of the discharging switch 202 if both slow turn-ON time and fast turn-ON time are needed in the applications.

Figure 5:
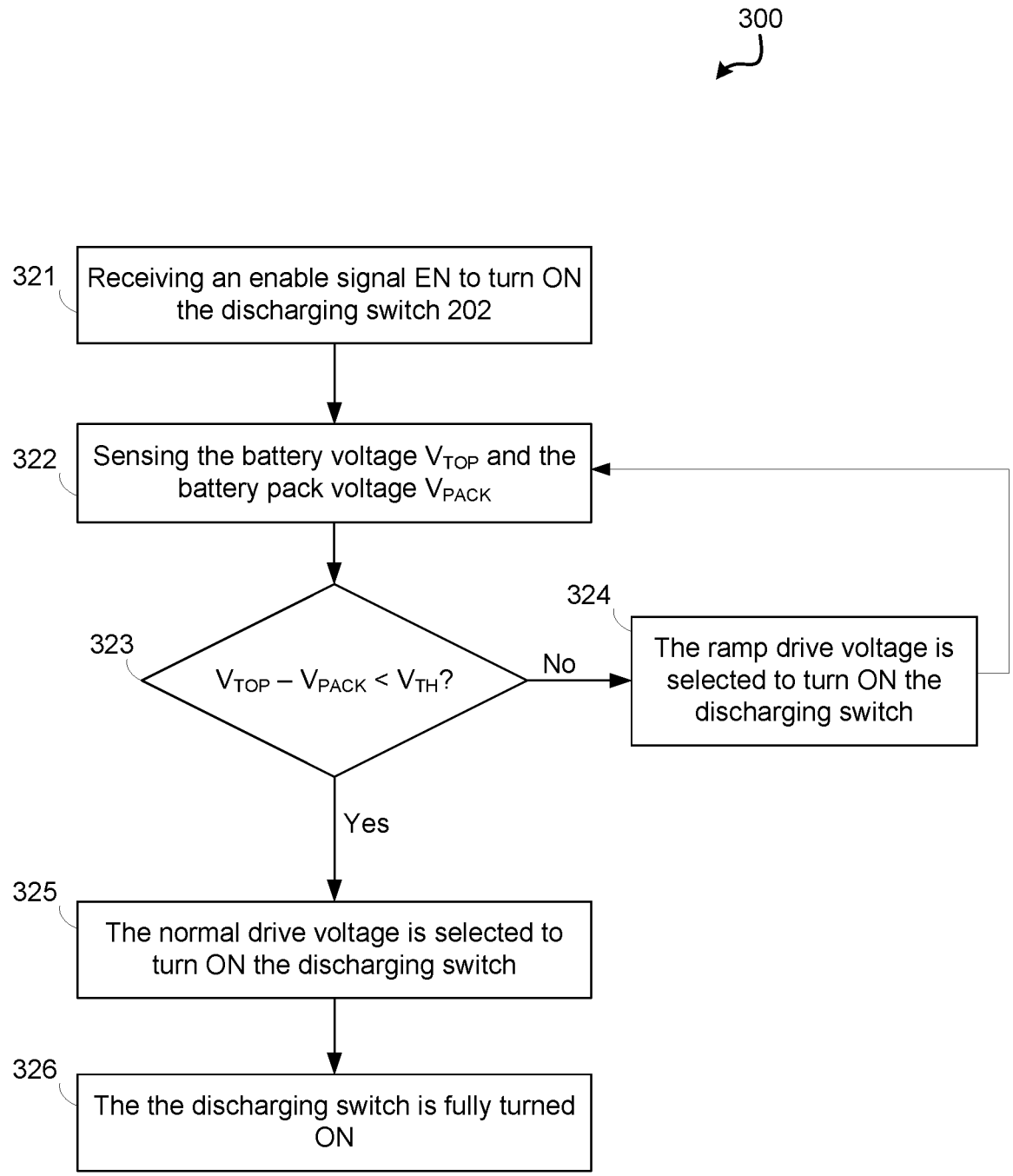
FIG. 5 shows a flow diagram of a battery pack discharge method 300 in accordance with an embodiment of the present invention.

FIG. 5 shows a flow diagram of a battery pack discharge method 300 in accordance with an embodiment of the present invention. The discharge method 300 of FIG. 5 is explained using the components shown in FIG. 3 for illustration purposes only.

In the embodiment of FIG. 5, the BMS 310 receives the enable signal EN to turn ON the discharging switch 202 (step 321). The BMS 310 senses the battery voltage $V_{TOP}$ and the battery pack voltage $V_{PACK}$ (step 322). The condition if the voltage difference $V_{TOP}-V_{PACK}$ is less than the threshold voltage $V_{TH}$ is determined (step 323). When $V_{TOP}-V_{PACK}>V_{TH}$, for example, the capacitor 610 is fully discharged and there is no electrical charge in the capacitor 610, the ramp drive voltage $V_{RAMP}$ is selected to turn ON the discharging switch 202 (step 324). The discharging switch 202 is controlled to operate in three operational states. When $V_{TOP}-V_{PACK}<V_{TH}$, the normal drive voltage $V_{CP}$ is selected to turn ON the discharging switch 202 (step 325). The discharging switch 202 is controlled to operate in linear mode and is fully turned ON (step 326). Furthermore, after step 324, the process of determining if the condition $V_{TOP}-V_{PACK}<V_{TH}$ happens is repeated until the discharging switch 202 is fully turned ON.

A person of ordinary skill in the art should know that the ramp drive generator 313 may have different circuit configurations while having the same or similar function. For example, FIG. 6 and FIG. 7 each show a circuit diagram of the ramp generator 313 according to two embodiments of the present invention.

Figure 6:
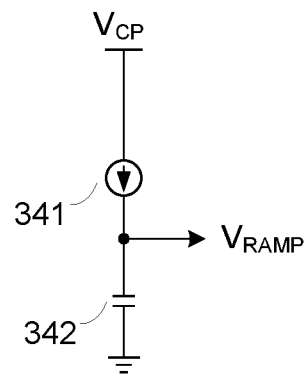
FIG. 6 shows a ramp drive generator 313A in accordance with an embodiment of the present invention.

As shown in FIG. 6, the ramp drive generator 313A comprises a current source 341 and a first capacitor 342. The current source 341 has an input terminal and an output terminal, wherein the input terminal is coupled to the output terminal of the normal drive generator 312 to receive the normal drive voltage $V_{CP}$, and the output terminal is coupled to a ground terminal through the first capacitor 342. The ramp drive generator 313A is configured to provide the ramp drive voltage $V_{RAMP}$, which is generated by the current source 341 charging the first capacitor 342. In one embodiment, the ramp drive voltage $V_{RAMP}$ can be controllable by adjusting the value of the current source 341 and/or the value of the first capacitor 342.

In one embodiment, the ramp drive generator 313B comprises a digital counter 351 and a digital analog converting circuit 352. The digital counter 351 and the digital analog converting circuit 352 works together to generate the ramp drive voltage $V_{RAMP}$, which is gradually increased in the plurality of steps until the magnitude of the ramp drive voltage $V_{RAMP}$ reaches the normal drive voltage $V_{CP}$, as shown in FIG. 4, the ramp drive voltage $V_{RAMP}$ is increased by a preset value during each of the plurality of steps.

Figure 7:
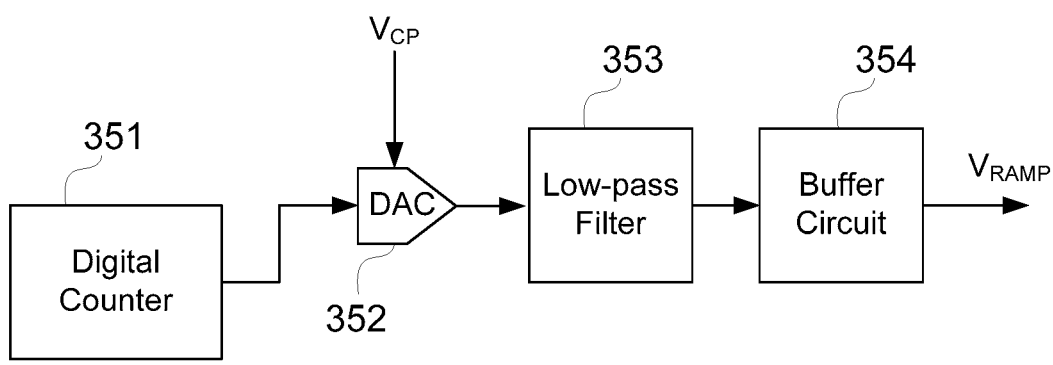
FIG. 7 shows a ramp drive generator 313B in accordance with another embodiment of the present invention.

In another embodiment, as shown in FIG. 7, the ramp drive generator 313B further comprises a low-pass filter 353 and a buffer circuit 354. The low-pass filter 353 is configured to filter the signal outputted by the digital analog converting circuit 352. The buffer circuit 354 is configured to provide the desired ramp drive voltage $V_{RAMP}$. In one embodiment, the buffer circuit 354 comprises a buffer. An input of the buffer is coupled to the output of the low-pass filter 353, and an output of the buffer is configured to provide a buffered signal. In one embodiment, the buffer is a unity-gain buffer, i.e., it has a voltage gain of one. In another embodiment, voltage gain of the buffer may be other value. In one embodiment, the buffer may comprise a voltage follower.

Figure 8:
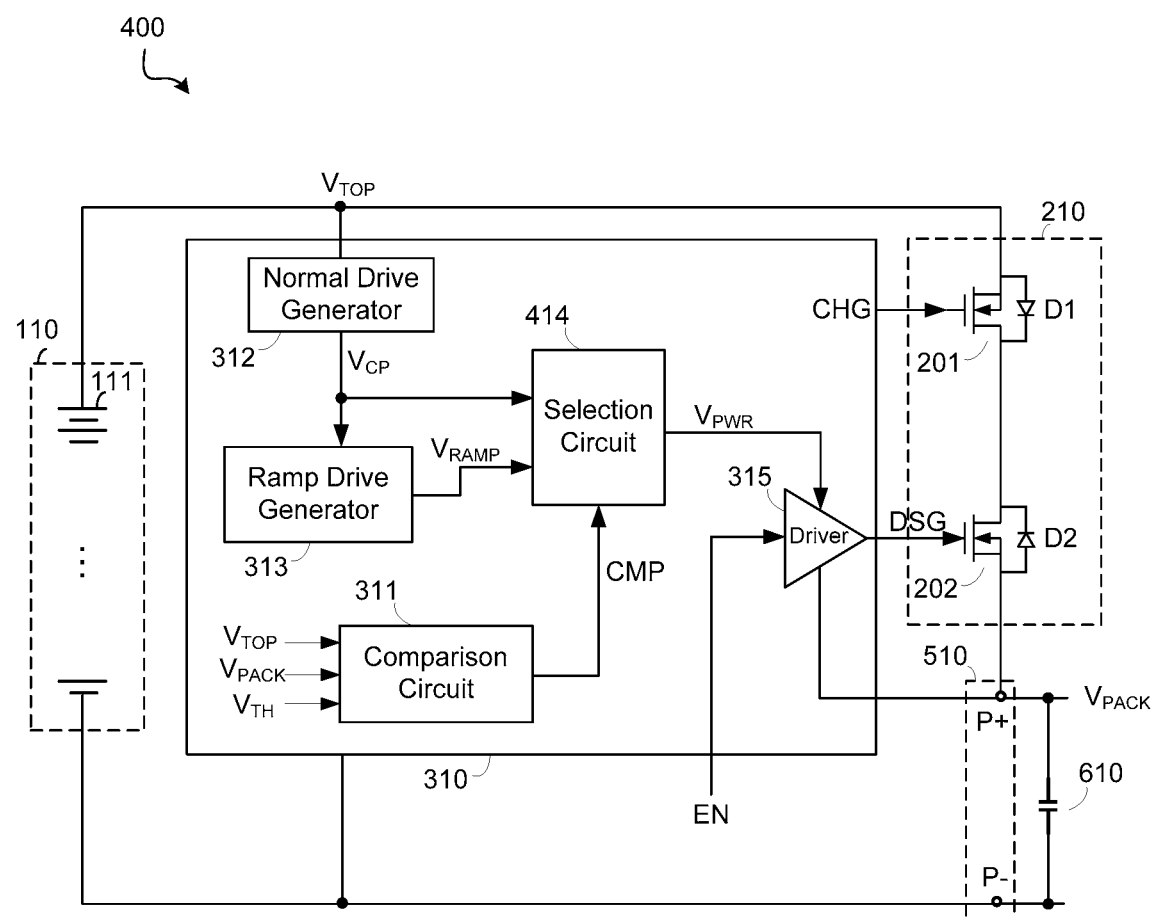
FIG. 8 shows a battery pack 400 in accordance with another embodiment of the present invention.

FIG. 8 shows a battery pack 400 in accordance with another embodiment of the present invention. The battery pack 400 of FIG. 8 is different from the battery pack 200 of FIG. 3 in that the selection circuit 414 is further configured to select a maximum value between the battery pack voltage $V_{PACK}$ and the ramp drive voltage $V_{RAMP}$ as the drive voltage $V_{PWR}$ of the driver circuit 315 when $V_{TOP}-V_{PACK}>V_{TH}$.

Figure 9:
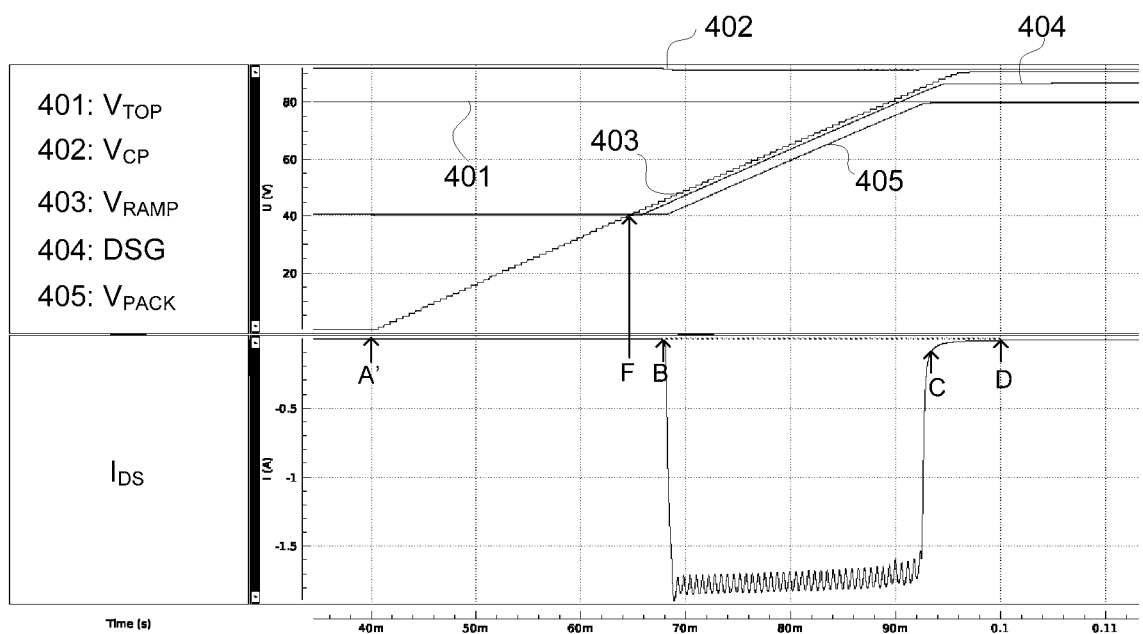
FIG. 9 shows a waveform diagram of the battery pack 400 shown in FIG. 8 in accordance with an embodiment of the present invention.

FIG. 9 shows a waveform diagram of the battery pack 400 shown in FIG. 8 in accordance with an embodiment of the present invention.

In the embodiment of FIG. 9, before point A', the discharging switch 202 is off, the capacitor 610 is discharged but the battery pack voltage $V_{PACK}$ is higher than 0V, such as 40V. When the enable signal EN to turn ON the discharging switch 202 is received and $V_{TOP}-V_{PACK}>V_{TH}$, the ramp voltage $V_{RAMP}$ starts to increase continuously from point A'. From point A and point B, the discharging switch 202 operates in cut-off region, in the first operational state, and the battery pack voltage $V_{PACK}$ is unchanged.

However, during the period between point A' and F, if the ramp drive voltage $V_{RAMP}$ is provided to the power supply terminal of the driver circuit 315 and the ground reference terminal of the driver circuit 315 is coupled to the positive terminal P+, a high negative voltage difference between the ramp drive voltage $V_{RAMP}$ and the battery pack voltage $V_{PACK}$ is supplied to the driver circuit 315 and can cause the damage to the discharging switch 202. In order to address this issue, the selection circuit 414 shown in FIG. 8 is configured to select a maximum value between the battery pack voltage $V_{PACK}$ and the ramp drive voltage $V_{RAMP}$ as the drive voltage $V_{PWR}$ provided to the driver circuit 315. In other words, when $V_{TOP}-V_{PACK}>V_{TH}$, the selection circuit 818 provides the battery pack voltage $V_{PACK}$ to the driver circuit 315 instead of providing the ramp drive voltage $V_{RAMP}$ to the driver circuit 315 during the period between point A' and F, in order to protect the driver circuit 315. After point F, the selection circuit 414 provides the ramp drive voltage $V_{RAMP}$ to the driver circuit 315 when $V_{TOP}-V_{PACK}>V_{TH}$.

A person of ordinary skill in the art should know that in other embodiments, the protection to the discharging switch 202 due to the high negative voltage difference in the driver circuit 315 can also be realized by using other ways. For example, the driver circuit 315 can be disabled until the ramp driver voltage $V_{RAMP}$ is higher than the battery pack voltage $V_{PACK}$ when $V_{TOP}-V_{PACK}>V_{TH}$.

Even though the BMS for the charge and discharge circuit 210 coupled between the positive terminal of the battery 110 and the positive pack terminal P+ are described and discussed in the embodiments of the present invention, it is appreciated that in other embodiment, the BMS for the charge and discharge circuit coupled between the negative terminal of the battery 110 and the negative pack terminal P− can also be made and modified without deviating from the spirit and scope of various embodiments of the present invention.

Even though the NMOS devices are applied in the charge and discharge circuit 210 in the embodiments of the present invention, it is appreciated that in other embodiment, the PMOS devices can also be applied in the charge and discharge circuit 210 with appropriate driving circuit, for example, the modifications and alterations of the drive voltage generator may be made while retaining the teachings of the invention, for example, the charger pump circuit is omitted for driving the PMOS devices.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A battery management system (BMS) used in a battery pack, wherein the battery pack has a discharging switch coupled between a battery and a load, and wherein the load has a capacitor charged by the battery pack, the BMS comprising:
    a driver circuit having a power supply terminal coupled to receive a drive voltage, a ground reference terminal coupled to receive the battery pack voltage, and an output terminal coupled to a control terminal of the discharging switch, the BMS is configured to generate a normal drive voltage and a ramp drive voltage, wherein the normal drive voltage is selected as the drive voltage of the driver circuit when the voltage difference between the battery voltage and the battery pack voltage is less than a threshold voltage, and the ramp drive voltage is selected as the drive voltage of the driver circuit when the voltage difference between the battery voltage and the battery pack voltage is higher than the threshold voltage, and wherein the driver circuit is configured to generate a discharging control signal to control the discharging switch.

2. The BMS of claim 1, wherein the normal drive voltage is configured to make the discharging switch fully turn ON, and the ramp drive voltage is configured to make the discharging switch operate in three operational states.

3. The BMS of claim 1, wherein further comprises:
    a comparison circuit configured to receive the battery voltage, the battery pack voltage and the threshold voltage, wherein the comparison circuit is configured to provide a comparison signal based on a comparison of the voltage difference between the battery voltage and the battery pack voltage with the threshold voltage;
    a normal drive generator configured to generate the normal drive voltage;
    a ramp drive generator configured to receive the normal drive voltage and to generate the ramp drive voltage;
    a selection circuit configured to select the ramp drive voltage or the normal drive voltage as the drive voltage based on the comparison signal; and
    wherein the driver circuit further has an enable terminal, the enable terminal is coupled to receive an enable signal to turn ON the discharging switch.

4. The BMS of claim 1, wherein the slope of the ramp drive voltage is variable and controllable.

5. The BMS of claim 3, wherein the ramp drive voltage is gradually increased to reach the normal drive voltage for limiting an excessive current flowing into the capacitor.

6. The BMS of claim 3, wherein the ramp drive voltage is gradually increased in a plurality of steps until the magnitude of the ramp drive voltage reaches the normal drive voltage, and wherein the ramp drive voltage is increased by a preset value during each of the plurality of steps.

7. The BMS of claim 3, wherein the selection circuit is further configured to select a maximum value between the battery pack voltage and the ramp drive voltage as the drive voltage when the voltage difference between the battery voltage and the battery pack voltage is higher than the threshold voltage.

8. A battery pack coupled to a capacitor of a load, comprising:
    a charge and discharge circuit including a charging switch and a discharging switch coupled in series, wherein the charge and discharge circuit is coupled between a battery and a terminal of the capacitor; and
    a BMS configured to generate a normal drive voltage and a ramp drive voltage, and the BMS comprises:
        a driver circuit having a power supply terminal coupled to receive a drive voltage, a ground reference terminal coupled to the terminal of the capacitor, and an output terminal coupled to a control terminal of the discharging switch, wherein the normal drive voltage is selected as the drive voltage of the driver circuit when the voltage difference between the battery voltage and the battery pack voltage is less than a threshold voltage, and the ramp drive voltage is selected as the drive voltage of the driver circuit when the voltage difference between the battery voltage and the battery pack voltage is higher than the threshold voltage, and wherein the driver circuit is configured to provide a discharging control signal to control the discharging switch.

9. The battery pack of claim 8, wherein the normal drive voltage is configured to make the discharging switch fully turn ON, and the ramp drive voltage is configured to make the discharging switch operate in three operational states.

10. The battery pack of claim 8, wherein the BMS comprises:
a comparison circuit configured to receive the battery voltage, the battery pack voltage and the threshold voltage, wherein the comparison circuit is configured to provide a comparison signal based on a comparison of the voltage difference between the battery voltage and the battery pack voltage with the threshold voltage;
a normal drive generator configured to generate the normal drive voltage;
a ramp drive generator configured to receive the normal drive voltage and to generate the ramp drive voltage;
a selection circuit configured to select the ramp drive voltage or the normal drive voltage as the drive voltage based on the comparison signal; and
wherein the driver circuit further has an enable terminal, the enable terminal is coupled to receive an enable signal to turn ON the discharging switch.

11. The battery pack of claim 10, wherein the load comprises a motor driven by the electrical charge stored in the capacitor.

12. The battery pack of claim 10, wherein the ramp drive voltage is gradually increased to reach the normal drive voltage for limiting an excessive current flowing into the capacitor.

13. The battery pack of claim 10, wherein the ramp drive voltage is gradually increased in a plurality of steps until the magnitude of the ramp drive voltage reaches the normal drive voltage, and wherein the ramp drive voltage is increased by a preset value during each of the plurality of steps.

14. The battery pack of claim 10, wherein the selection circuit is further configured to receive the battery pack voltage and to select a maximum value between the battery pack voltage and the ramp drive voltage as the drive voltage when the voltage difference between the battery voltage and the battery pack voltage is higher than the threshold voltage.

15. A battery pack discharge method, wherein the battery pack has a discharging switch coupled between a battery and a load, and wherein the load has a capacitor charged by the battery pack, the battery pack discharge method comprises:
receiving an enable signal to turn ON the discharging switch;
determining whether the voltage difference between the battery voltage and the battery pack voltage is higher than a threshold voltage;
controlling the discharging switch to fully turn ON when the voltage difference between the battery voltage and the battery pack voltage is less than the threshold voltage; and
controlling the discharging switch to operate in three operational states when the voltage difference between the battery voltage and the battery pack voltage is higher than the threshold voltage.

16. The battery pack discharge method of claim 15, further comprising:
generating a normal drive voltage;
generating a ramp drive voltage based on the normal drive voltage;
selecting the normal drive voltage or the ramp drive voltage as a drive voltage supplied to a power supply terminal of a driver circuit based on the voltage difference between the battery voltage and the battery pack voltage;
supplying the battery pack voltage to a ground reference terminal of the driver circuit; and
generating a discharging control signal using the drive circuit to control of the discharging switch.

17. The battery pack discharge method of claim 16, wherein the slope of the ramp drive voltage is variable and controllable.

18. The battery pack discharge method of claim 16, wherein the ramp drive voltage is gradually increased to reach the normal drive voltage for limiting an excessive current flowing into the capacitor.

19. The battery pack discharge method of claim 16, wherein the ramp drive voltage is gradually increased in a plurality of steps until the magnitude of the ramp drive voltage reaches the normal drive voltage, and wherein the ramp drive voltage is increased by a preset value during each of the plurality of steps.

20. The battery pack discharge method of claim 16, further comprises selecting a maximum value between the battery pack voltage and the ramp drive voltage as the drive voltage of a driver circuit when the voltage difference between the battery voltage and the battery pack voltage is higher than the threshold voltage.

* * * * *